US006532548B1

(12) United States Patent
Hughes

(10) Patent No.: US 6,532,548 B1
(45) Date of Patent: Mar. 11, 2003

(54) SYSTEM AND METHOD FOR HANDLING TEMPORARY ERRORS ON A REDUNDANT ARRAY OF INDEPENDENT TAPES (RAIT)

(75) Inventor: James P. Hughes, Lino Lakes, MN (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/400,652

(22) Filed: Sep. 21, 1999

(51) Int. Cl.⁷ .............................................. G06F 11/10
(52) U.S. Cl. .......................................... 714/6; 714/770
(58) Field of Search ......................... 714/6, 7, 8, 770; 711/114

(56) References Cited

U.S. PATENT DOCUMENTS

| | | | |
|---|---|---|---|
| 4,205,324 A | | 5/1980 | Patel |
| 5,258,984 A | * | 11/1993 | Menon et al. ................. 714/7 |
| 5,390,327 A | * | 2/1995 | Lubbers et al. ................ 714/7 |
| 5,499,253 A | * | 3/1996 | Lary .......................... 711/114 |
| 5,537,534 A | | 7/1996 | Voight et al. |
| 5,550,998 A | | 8/1996 | Fechnes et al. |
| 5,566,316 A | | 10/1996 | Willis et al. |
| 5,671,349 A | | 9/1997 | Hashemi et al. |
| 5,812,753 A | | 9/1998 | Chiariotti |
| 5,859,965 A | | 1/1999 | Gittins et al. |
| 5,893,164 A | | 4/1999 | Legg |
| 5,911,150 A | | 6/1999 | Peterson et al. |
| 6,070,249 A | * | 5/2000 | Lee ........................... 711/114 |
| 6,101,615 A | * | 8/2000 | Lyons ........................ 711/114 |
| 6,223,323 B1 | * | 4/2001 | Wescott ...................... 714/770 |

FOREIGN PATENT DOCUMENTS

| | | |
|---|---|---|
| EP | 462 917 | 12/1991 |
| EP | 519 669 | 12/1992 |
| EP | 559 487 | 9/1996 |

OTHER PUBLICATIONS

Lee et al., "Double Parity Sparing for Performance Improvement in Disk Arrays", Jun. 1996, IEEE, pp. 169–174.*
Blaum, M. et al.: Evenodd: An Optimal Scheme for Tolerating Double Disk Failures in Raid Architectures, Computer Architecture News, US, Association for Computing Machinery, New York, vol. 22, No. 2, Apr. 1, 1994, pp. 245–254, XP000450355, ISSN: 0163–5964.

* cited by examiner

Primary Examiner—Scott Baderman
(74) Attorney, Agent, or Firm—Brooks & Kushman P.C.

(57) ABSTRACT

A system and method for storing data in a storage system having storage elements arranged in parallel for concurrent access such that data can be continuously communicated to the storage element array while one of the storage elements is in error recovery. Some of the storage elements receive data of a stripe and the remaining storage elements receive parity information based on the data of the stripe. An unresponsive storage element in error recovery is dropped from the other storage elements for receiving data until error recovery is complete and the storage element is responsive for receiving data. While the storage element is unresponsive, one of the storage elements scheduled to receive parity information receives data to be written to the unresponsive storage element instead of the parity information. Communication to the storage elements continues while the failed storage element is in error recovery. Error recovery is accomplished by using the parity information of the other parity information storage elements.

6 Claims, 3 Drawing Sheets

| TIME | PHYSICAL MEMBER TAPES | | | | | |
|---|---|---|---|---|---|---|
| | MEMBER 0 | MEMBER 1 | MEMBER 2 | MEMBER 3 | MEMBER 4 | MEMBER 5 |
| 1 | CHUNK 0 | CHUNK 1 | CHUNK 2 | CHUNK 3 | PARITY 0 | PARITY 0 |
| 2 | PARITY 1 | CHUNK 4 | CHUNK 5 | CHUNK 6 | CHUNK 7 | PARITY 1 |
| 3 | PARITY 2 | PARITY 2 | CHUNK 8 | CHUNK 9 | CHUNK 10 | CHUNK 11 |
| 4 | CHUNK 15 | PARITY 3 | PARITY 3 | CHUNK 12 | CHUNK 13 | CHUNK 14 |
| 5 | CHUNK 18 | - | CHUNK 19 | PARITY 4 | CHUNK 16 | CHUNK 17 |
| 6 | CHUNK 21 | - | CHUNK 22 | CHUNK 23 | PARITY 5 | CHUNK 20 |
| 7 | CHUNK 24 | - | CHUNK 25 | CHUNK 26 | CHUNK 27 | PARITY 6 |
| 8 | PARITY 7 | PARITY 7 | CHUNK 28 | CHUNK 29 | CHUNK 30 | CHUNK 31 |
| 9 | CHUNK 35 | PARITY 8 | PARITY 8 | CHUNK 32 | CHUNK 33 | CHUNK 34 |

FIG.3

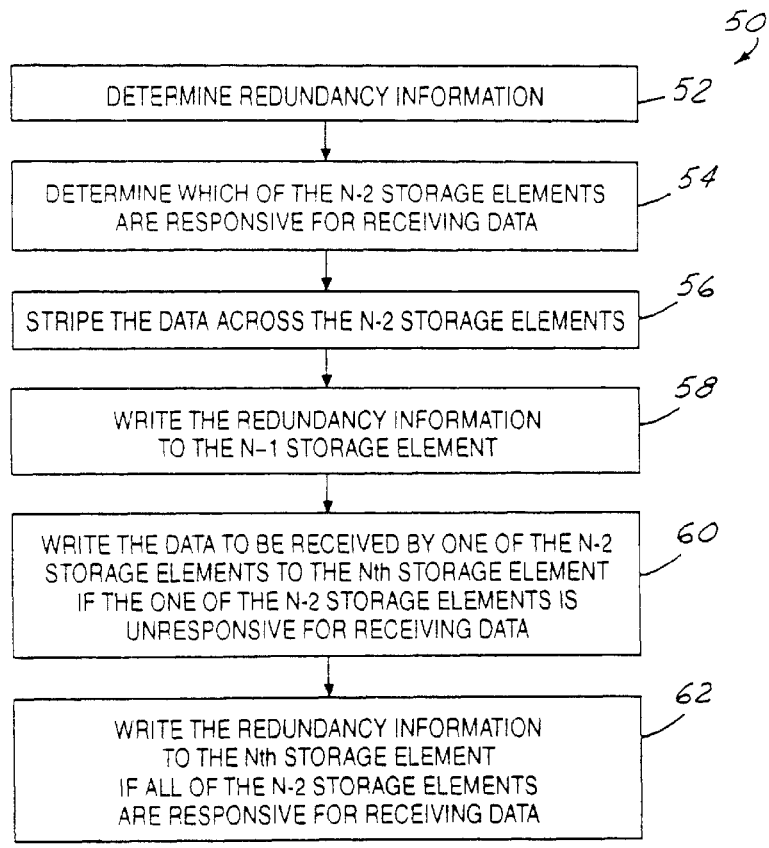

FIG.4

SYSTEM AND METHOD FOR HANDLING TEMPORARY ERRORS ON A REDUNDANT ARRAY OF INDEPENDENT TAPES (RAIT)

TECHNICAL FIELD

The present invention relates generally to redundant arrays of independent disks (RAID) and, more particularly, to a system and method for handling temporary errors on a redundant array of independent tapes (RAIT).

BACKGROUND ART

A data storage array is a collection of storage elements that are accessible by a host computer as a single storage unit. The individual storage elements can be any type, or a combination of types, of storage devices such as, hard disk drives, semiconductor memory, optical disk drives, magnetic tape drives, and the like. A common storage array comprises a plurality of hard disk drives, i.e., a disk array.

A disk array includes a collection of disks and a disk array controller. The controller controls the operation of the disks and presents them as a virtual disk to a host operating environment. The host operating environment is typically a host computer that executes an operating system and application programs. A virtual disk is an abstract entity realized by the controller and the disk array. A virtual disk is functionally identical to a physical disk from the standpoint of application software executing on the host computer.

One such disk array is a redundant array of independent disks (RAID). RAID comes in various operating levels which range from RAID level 0 (RAID-0) to RAID level 6 (RAID-6). Additionally, there are multiple combinations of the various RAID levels that form hybrid RAID levels such as RAID-5+, RAID-6+, RAID-10, RAID-53 and so on. Each RAID level represents a different form of data management and data storage within the RAID disk array.

In a RAID-5 array, data is generally mapped to the various physical disks in data "stripes" across the disks and vertically in a "strip" within a single disk. To facilitate data storage, a serial data stream is partitioned into blocks of data, the size of each block is generally defined by the host operating environment. Typically, one or more blocks of data are stored together to form a "chunk" or "segment" of data at an address within a given disk. Each chunk is stored on a different disk as the data is striped across the disks. Once all the disks in a stripe have been given chunks of data, the storage process returns to the first disk in the stripe, and stripes across all the disks again. As such, the input data stream is stored in a raster scan pattern onto all the disks in the array.

In a RAID-5 array, data consistency and redundancy is assured using parity data that is distributed amongst all the disks. Specifically, a RAID-5 array contains N member disks. Each stripe of data contains N–1 data strips and one parity strip. The parity segments of the array are distributed across the array members usually in cyclic patterns. For example, in an array containing five disks, the first parity strip is located in member disk four, the second parity strip on member disk three, and the third parity strip on member disk two, and so on.

RAID-5 parity is generated using an exclusive OR (XOR) function. In general, parity data is generated by taking an XOR function of the user data strips within a given data stripe. Using the parity information, the contents of any strip of data on any single one of the data disks in the array can be regenerated from the contents of the corresponding strips on the remaining disks in the array. Consequently, if the XOR of the contents of all corresponding blocks in the data stripe, except one is computed, the result is the content of the remaining block. Thus, if disk three in the five disk array should fail, for example, the data it contains can still be delivered to applications by reading corresponding blocks from all the surviving members and computing the XOR of their contents. As such, the RAID-5 array is said to be fault tolerant, i.e., the loss of one disk in the array does not impact data availability.

A problem with typical data storage element arrays is that in the event of a failed data storage element, data communication to all of the storage elements is stopped until the failed storage element executes its error recovery. The error recovery involves using the contents from the other storage elements to reconstruct the contents of the failed storage element. The probability of the data being corrected is high. However, a failed storage element can be unresponsive for significant periods. Consequently, the reading and writing of data from and to the data storage array are slowed.

What is needed are a method and system for handling temporary errors in a data storage element array that continuously communicate data to and from the array while a storage element is in error recovery.

SUMMARY OF THE INVENTION

Accordingly, it is an object of the present invention to provide a method and system for storing data in an array of storage elements arranged in parallel having data storage elements and redundant information storage elements in which data to be written to one of the data storage elements is written to one of the redundant information storage elements in place of redundant information if the one of the data elements is unresponsive for receiving data.

It is another object of the present invention to provide a method and system for storing data in an array of storage elements arranged in parallel having data storage elements and redundant information storage elements in which data is written to one of the redundant information storage elements in place of redundant information as long as one of the data elements is unresponsive for receiving data.

In carrying out the above objects and other objects, the present invention provides a method for storing data in a storage system having N storage elements arranged in parallel for concurrent access, where N is an integer greater than three. The method includes determining first redundancy information based on a first row of data to be striped across N–2 storage elements. Which of the N–2 storage elements are responsive for receiving data are then determined. The first row of data is then striped across the responsive storage elements of the N–2 storage elements if at least N–3 of the N–2 storage elements are responsive for receiving data. The first redundancy information is then written to the N–1 storage element. The data to be received by one of the N–2 storage elements is then written to the Nth storage element if the one of the N–2 storage elements is unresponsive for receiving data. The first redundancy information is written to the Nth storage element if all of the N–2 storage elements are responsive for receiving data.

In one embodiment, the method further includes determining second redundancy information based on a second row of data to be striped across the N–2 storage elements. The second row of data is then striped across the responsive storage elements of the N–2 storage elements if at least N–3 of the N–2 storage elements are responsive for receiving data. The second redundancy information is then written to the N−1 storage element. The data of the second row to be received by one of the N−2 storage elements is then written to the Nth storage element if the one of the N−2 storage elements is unresponsive for receiving data.

In another embodiment, the method further includes determining second redundancy information based on a second row of data to be striped across the N−2 storage elements and then determining if the one of the N−2 storage elements is still unresponsive for receiving data. The second row of data is then striped across the responsive storage elements of the N−2 storage elements if at least N−3 of the N−2 storage elements are responsive for receiving data. The second redundancy information is then written to the N−1 storage element. The data of the second row to be received by the one of the N−2 storage elements is then written to the Nth storage element if the one of the N−2 storage elements is still unresponsive for receiving data.

Further, in carrying out the above objects and other objects, the present invention provides a system in accordance with the above described method.

The advantages accruing to the present invention are numerous. Data can be continuously communicated to and from the storage element array while a storage element is in error recovery because the unresponsive storage element is dropped from the other storage elements for receiving data until error recovery is complete and the storage element is responsive for receiving data. While the storage element is unresponsive, one of the storage elements scheduled to receive redundant (parity) information receives the data to be written to the unresponsive storage element instead of the redundant information. Accordingly, communication to the storage elements never needs to be stopped while the failed storage element executes its error recovery. Further, error recovery can still be accomplished by using the redundant information of other redundant information storage elements.

The above objects and other objects, features, and advantages embodiments of the present invention are readily apparent from the following detailed description of the best mode for carrying out the present invention when taken in connection with the accompanying drawings.

BRIEF DESCRIPTION OF THE DRAWINGS

FIG. 3 illustrates data and parity information written to the storage members for nine data stripes in accordance with the present invention; and FIG. 4 illustrates a flow chart showing operation of the method and system of the present invention.

BEST MODES FOR CARRYING OUT THE INVENTION

Figure 1:
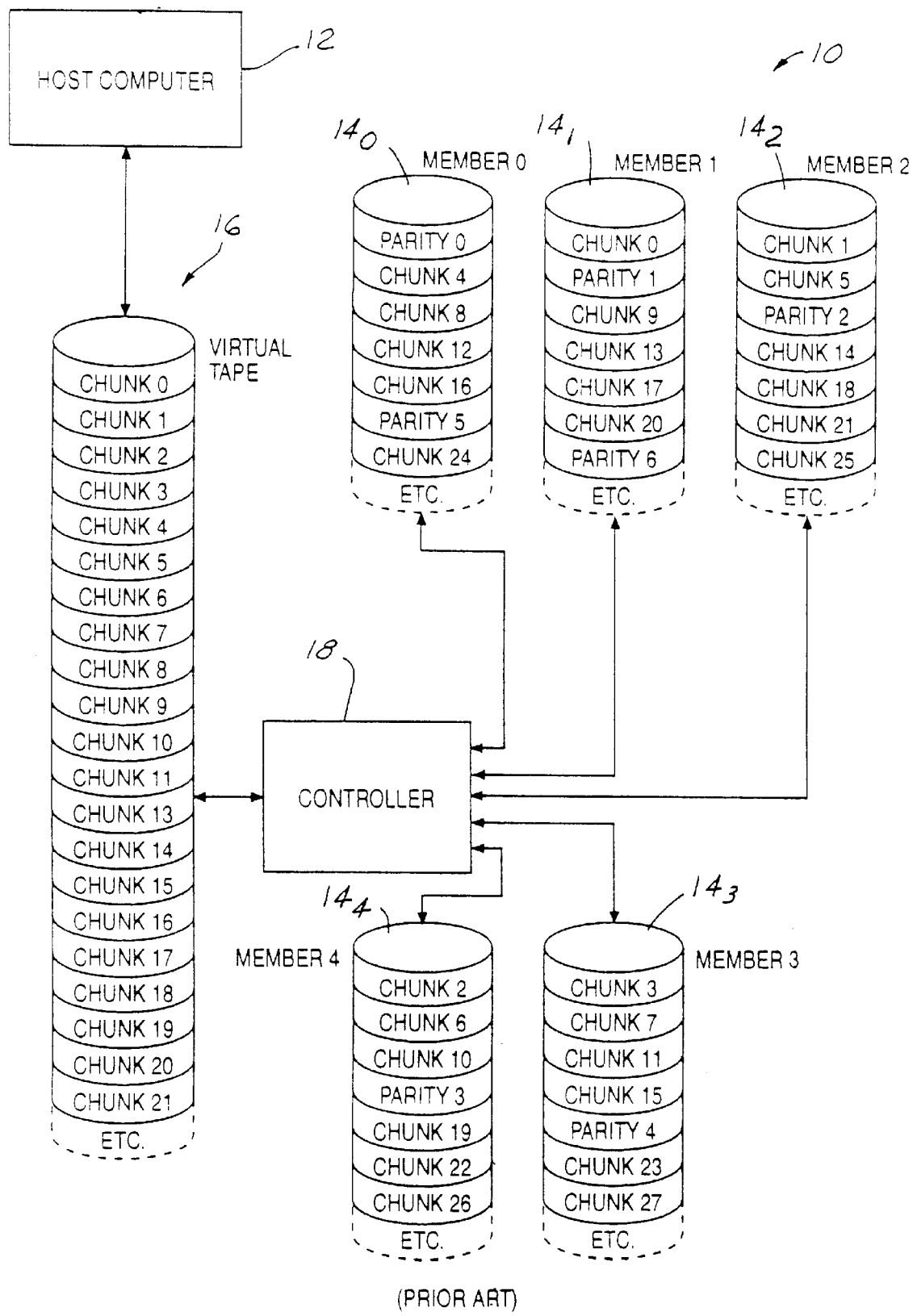
FIG. 1 illustrates a block diagram of a conventional storage element array system.

Referring now to FIG. 1, an information storage system 10 containing a host computer 12 and a plurality of individual data storage elements $14_n$, where n is an integer value representing a data storage element number. Host computer 12 executes, on one or more processors, an operating system as well as various applications that periodically read and write information from and to the storage elements. For simplicity, the combination of the operating system and applications shall be referred to as the operating environment. The operating environment accesses various ones of the storage elements as if the individual storage elements functioned as a single, large storage element.

Typically, the storage elements are inexpensive hard disk drives arranged in an array. Various other forms of data storage elements may be substituted for, or combined with, the disks. Such other forms of storage elements include, but are not limited to, optical drives, ZIP drives, floppy disk drives, semiconductor memory devices, magnetic tape drives, or any other form of random access memory. Although any of these other forms of storage elements may be used with the present invention, the following discussion refers to magnetic tape drives as the storage elements.

When using magnetic tape drives, the operating environment treats magnetic tape drives $14_n$, as a single magnetic tape commonly referred to as a virtual tape 16. The data is represented to host computer 12 as being stored in virtual tape 16 in serial fashion. Thus, the operating environment requests data from virtual tape 16 using a convenient single address. A controller 18 ensures that the address into virtual tape 16 is mapped to an address within a physical magnetic tape drive within magnetic tape drives $14_n$. Controller 18 can also reside within host computer 12.

The physical magnetic tape drives $14_n$, known as member disks or members, are accessed via controller 18. The data is distributed, or striped, amongst physical members $14_n$ in an effort to evenly distribute access loading amongst all the members. To achieve fault tolerance, the data is arranged into redundancy groups where the data within a redundancy group is self consistent with the other data in the group. One technique for making the data redundant is to use parity data. As such, the redundancy group is a parity group in which the data in the group is XOR consistent.

Figure 2:
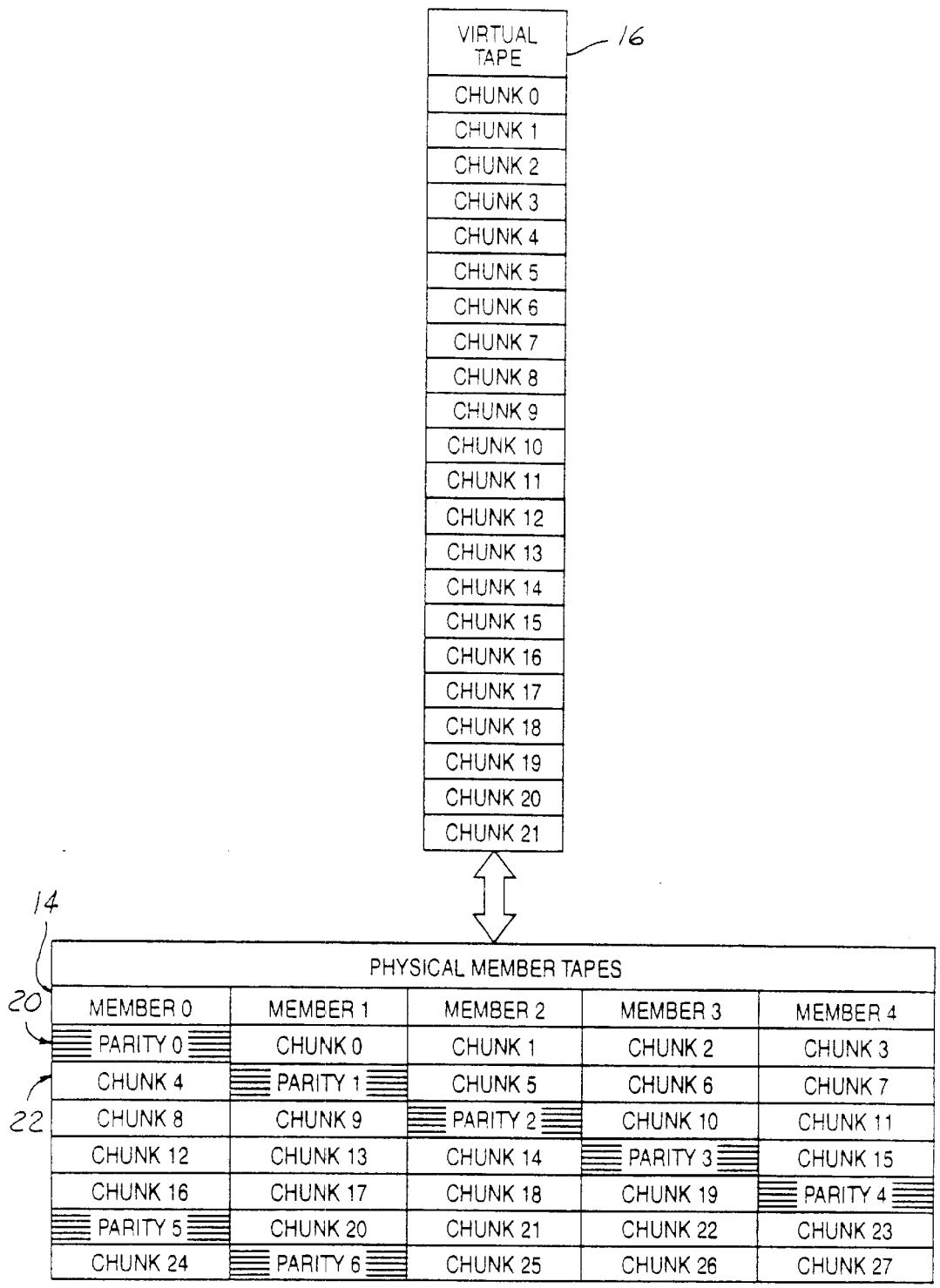
FIG. 2 illustrates a conventional data striping format for a RAIT-5 tape array system.

FIG. 2 depicts a conventional data striping format for a RAID-5 magnetic tape array. Under the RAID-5 standard, data appearing in virtual disk 16 is striped across the physical magnetic tape (members 0–4) in a raster scan fashion. Interposed within the data (chunks 0, 1, 2, and so on) is parity data (parity 0, 1, 2, and so on). Because the amount of data stored in each magnetic tape drive location is system or implementation specific, this data amount is simply referred to herein as a "chunk". The size of a chunk of parity data is the same as the size of the data chunks from which it is derived. Under RAID-5, the parity data is stored in a diagonal manner across the drives. However, the specific pattern of storage is not important as long as the parity data locations are mappable. Consequently, controller 18 knows where the parity information is stored such that the parity groups can be easily identified.

Use of parity information to form consistent data groups is well-known in the art and a description regarding the use of parity information in a RAIT-5 magnetic tape array system will clarify operation of the present invention. Parity data is generated by using an exclusive OR (XOR) function upon a series of data chunks typically located within a given data stripe 20. For example, in FIG. 2, the parity 0 data is formed by applying the XOR function to chunk 0 through chunk 3 (e.g., chunk 0 $\oplus$ chunk 1 $\oplus$ chunk 2 $\oplus$ chunk 3=parity 0). Similarly, in data stripe 202, chunk 4 $\oplus$ chunk 5 $\oplus$ chunk 6 $\oplus$ chunk 7=parity 1 and so on. Thus, under RAIT-5, each data stripe is XOR consistent. If one of the member tapes ceased to function, the information contained in the remaining member tapes is used to reconstruct the data on the damaged tape. For example, if member 2 were damaged, chunk 5 would be unreadable. However, chunk 5=chunk 4 $\oplus$ parity 1 $\oplus$ chunk 6 $\oplus$ chunk 7. Thus, the array is fault tolerant, i.e., if one member tape is damaged the system is still operational without any loss of data.

Referring now to FIGS. 3–4, with continual reference to FIGS. 1–2, the system and method of the present invention will be described. The system and method of the present invention includes a host computer 12, N individual data storage elements or members $14_n$, where N is an integer greater than three, and a controller 18. Preferably, members $14_n$ are magnetic tape drives. Controller 18 is operable to determine if members are responsive to receive data and parity information from host computer 12 for storage. As shown in FIG. 3, there are six members (members 0, 1, 2, 3, 4, and 5. As such, N is six with reference to FIG. 3 and the following description.

Up to N−2 members (i.e., four members) store data of any one stripe. These members are referred to as data storage members. With reference to first data stripe 24 shown in FIG. 3, members 0, 1, 2, and 3 are data storage members. The remaining two members (e.g., the N−1 and Nth members in first data stripe 24) are designated to receive redundant (parity) information based on the data of the stripe. These two members are referred to as redundant information storage members. The N−1 and Nth members are members 4 and 5 in first data stripe 24. The parity information written to the redundant information storage members such as the N−1 and Nth members in first data stripe 24 may be identical. The parity information may be different by using some kind of Reed Solomon code or an adaptation of adaptive cross parity as described in U.S. Pat. No. 4,205,324, hereby incorporated by reference. Using different parity information allows multiple errors to be corrected up to the number of parity strips.

When controller 18 determines that all of the data storage members are responsive for storing data from host computer 12 and all of the redundant information storage members are responsive for storing parity information from the host computer, the four data storage members store data of a stripe (i.e., a respective data strip of a data stripe) and the two redundant information storage members store parity information based on the data of the stripe.

When controller 18 determines that a redundant information storage member is unresponsive, then the unresponsive redundant information storage member is dropped from receiving redundant information until it has completed its error recovery. Redundant information from the other redundant information storage member is still available for performing error recovery and checks of the data of a stripe stored in the data storage members.

When controller 18 determines that a data storage member is unresponsive, then the controller drops the unresponsive data storage member from receiving data until it has completed its error recovery. While the data storage member is unresponsive, controller 18 directs the data to be stored to the unresponsive data storage member to one of the redundant information storage members (such as the Nth storage member in first data stripe 24) in place of redundant information. As a result, controller 18 substitutes one of the redundant information storage members for the unresponsive data storage member. For each stripe, controller 18 substitutes the second redundant information storage member for the unresponsive data storage member as long as the data storage member is unresponsive. Error recovery can still be performed even though one of the redundant information storage members is receiving data by using the redundant information stored in the first redundant information storage member.

As an example, as shown in FIG. 3, the system of the present invention includes N members $14_n$, where N is equal to six. Each stripe of data contains N−2 data strips and at least one parity strip up to a maximum of two parity strips. The parity strips are distributed across the array members preferably in cyclic patterns. For example, in first data stripe 24, the first parity strip (parity 0) is located in members four and five; in second data stripe 26, the second parity strip (parity 1) on members zero and five; and, in third data stripe 28, the third parity strip (parity 2) on members zero and one, and so on.

In data stripe 24, controller 18 determines that all of the storage members are responsive for receiving data and parity information and the system is in normal operation. As a result, data storage members (members $140_{0-3}$) store respective data chunks and parity information storage members (members $14_{4-5}$) store parity information. In data stripe 26, member $14_1$ is in error and starts its error recovery process. Controller 18 is unaware that member $14_1$ is in error recovery and directs chunk 4 for storage on member $14_1$. Although member $14_1$ is in error recovery, member $14_1$ is still responsive and accepts chunk 4 for storage into its buffer. Once error recovery is complete, member $14_1$ moves chunk 4 from its buffer to the magnetic tape of member $14_1$. The other members are responsive and store data and parity information as shown. On read, all data including information present in the buffer at the start of error recovery will be read.

In data stripe 28, member $14_1$ is still performing error recovery but is still responsive to accept parity 2 for storage into its buffer. Controller 18 is still unaware that member $14_1$ is in error recovery and directs parity 2 for storage on member $14_1$. Once error recovery is complete, member $14_1$ will move parity 2 from its buffer to the magnetic tape of member $14_1$.

In data stripe 30, member $14_1$ is still performing error recovery but is still responsive to accept parity 3 for storage into its buffer. At this point, controller 18 notices flow control indicative of member $14_1$ being in error recovery and then initiates dropping member $14_1$ from receiving data and parity information while it is unresponsive.

In data stripe 32, controller 18 drops member $14_1$ from receiving data. Controller 18 then directs member $14_2$ to receive data chunk 19 instead of parity 4. Thus, in data stripe 32, there is only one parity strip instead of two as in data stripes 24, 26, and 28. However, error recovery can still be accomplished because the parity information (parity 4) is stored in member $14_3$.

In data stripe 34, controller 18 maintains member $14_1$ as being dropped from receiving data. Controller 18 then directs member $14_2$ to receive data chunk 22 in place of member $14_1$ and directs member $14_3$ to receive data chunk 23 instead of parity 5. Similarly, in data stripe 36, controller 18 maintains member $14_1$ as being dropped from receiving data. Controller 18 then directs member $14_5$ which was scheduled to receive parity information (parity 6) to receive data chunk 27.

In data stripe 38, member $14_1$ has completed error recovery and is now responsive to be placed back into the lineup for receiving data and parity information. Controller 18 directs member $14_1$ to store parity 7 as member $14_1$ is scheduled to receive parity 7 in data stripe 38. The process continues under normal operation as shown in data stripe 40.

In operation, if the parity information is identical, then the number of corrections is limited to one per group of data chunks in a data stripe. If the parity information is not identical, then the number of corrections in a group of data chunks is variable. Assume that the number of parities is two and that, if there is a temporary error, the number of parities is reduced by one. The result is that one data chunk in error can always be recovered and two missing data chunks can be recovered if there was not a temporary error.

Referring now to FIG. 4, with continual reference to FIGS. 1–3, a flow chart 50 illustrating operation of the method and system of the present invention are shown. Flow chart 50 initially begins with box 52 determining first redundancy information based on a first row of data to be striped across N–2 storage elements. Box 54 then determines which of the N–2 storage elements are responsive for receiving data. Box 56 then stripes the first row of data across the responsive storage elements of the N–2 storage elements if at least N–3 of the storage elements of the N–2 storage elements are responsive for receiving data. Box 58 then writes the first redundancy information to the N–1 storage element. Box 60 then writes the data to be received by one of the N–2 storage elements to the Nth storage element if the one of the N–2 storage elements is unresponsive for receiving data.

Thus it is apparent that there has been provided, in accordance with the present invention, a data storage system and method that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for storing data in a storage system having N storage elements arranged in parallel for concurrent access, wherein N is an integer greater than three, wherein N–2 of the N storage elements are designated as data storage elements for each row of data and the remaining two of the N storage elements are designated as first and second redundant information storage elements for each row of data, the method comprising:

determining first redundancy information based on a first row of data to be striped across the N–2 storage elements;

determining first additional redundancy information based on the first row of data to be striped across the N–2 storage elements and the determined first redundancy information;

determining which of the N–2 storage elements are responsive for receiving data;

striping the first row of data across the responsive storage elements of the N–2 storage elements if at least N–3 of the N–2 storage elements are responsive for receiving data;

writing the first redundancy information to the first redundant information storage element;

writing the first additional redundancy information to the second redundant information storage element if all of the N–2 storage elements are responsive for receiving data; and writing the data to be received by one of the N–2 storage elements to the second redundant information storage element if the one of the N–2 storage elements is unresponsive for receiving data.

2. The method of claim 1 wherein:

the storage elements are magnetic tape drives.

3. The method of claim 1 wherein:

the storage elements are magnetic disk drives.

4. A data storage system comprising:

N storage elements arranged in parallel for concurrent access, wherein N is an integer greater than three, wherein N–2 of the N storage elements are designated as data storage elements for each row of data and the remaining two of the N storage elements are designated as first and second redundant information storage elements for each row of data; and a controller connected to each of the N storage elements, the controller operable for determining first redundancy information based on a first row of data to be striped across the N–2 storage elements, determining first additional redundancy information based on the determined first redundancy information and the first row of data to be striped across the N–2 storage elements, determining which of the N–2 storage elements are responsive for receiving data, striping the first row of data across the responsive storage elements of the N–2 storage elements if at least N–3 of the N–2 storage elements are responsive for receiving data, writing the first redundancy information to the first redundant information storage element, writing the first additional redundancy information to the second redundant information storage element if all of the N–2 storage elements are responsive for receiving data, and writing the data to be received by one of the N–2 storage elements to the second redundant information storage element if the one of the N–2 storage elements is unresponsive for receiving data.

5. The system of claim 4 wherein:

the storage elements are magnetic tape drives.

6. The system of claim 4 wherein:

the storage elements are magnetic disk drives.

* * * * *